United States Patent [19]
Gilbert et al.

[11] Patent Number: 5,475,842
[45] Date of Patent: Dec. 12, 1995

[54] METHOD OF COMPILATION OPTIMIZATION USING AN N-DIMENSIONAL TEMPLATE FOR RELOCATED AND REPLICATED ALIGNMENT OF ARRAYS IN DATA-PARALLEL PROGRAMS FOR REDUCED DATA COMMUNICATION DURING EXECUTION

[75] Inventors: John R. Gilbert, Palo Alto; Siddhartha Chatterjee, Sunnyvale; Robert S. Schreiber, Palo Alto, all of Calif.

[73] Assignee: Xerox Corporation, Stamford, Conn.

[21] Appl. No.: 104,755

[22] Filed: Aug. 11, 1993

[51] Int. Cl.⁶ ........................................ G06F 9/44
[52] U.S. Cl. ............................. 395/700; 364/DIG. 1; 364/232.22; 364/280.4; 364/280.5; 364/284; 364/284.3
[58] Field of Search ................ 364/228, 228.7, 364/229, 230, 232.22, 280.4, 280.5, 284, 284.3; 395/650, 700

[56] References Cited

U.S. PATENT DOCUMENTS 5,355,492 10/1994 Frankel et al. ................. 395/700
5,355,494 10/1994 Sistare et al. ................... 395/700

*Primary Examiner*—Kevin A. Kriess
*Assistant Examiner*—Jonathan Hall Backenstose

[57] ABSTRACT

When a data-parallel language like Fortran 90 is compiled for a distributed-memory machine, aggregate data objects (such as arrays) are distributed across the processor memories. The mapping determines the amount of residual communication needed to bring operands of parallel operations into alignment with each other. A common approach is to break the mapping into two stages: first, an alignment that maps all the objects to an abstract template, and then a distribution that maps the template to the processors. This disclosure deals with two facets of the problem of finding alignments that reduce residual communication; namely, alignments that vary in loops, and objects that permit of replicated alignments. It is shown that loop-dependent dynamic alignment is sometimes necessary for optimum performance, and algorithms are provided so that a compiler can determine good dynamic alignments for objects within "do" loops. Also situations are identified in which replicated alignment is either required by the program itself (via spread operations) or can be used to improve performance. An algorithm based on network flow is proposed for determing which objects to replicate so as to minimize the total amount of broadcast communication in replication.

1 Claim, 8 Drawing Sheets

```
real A ( 10, 10 ), V ( 20 )

do k = 1, 10
     A ( k, 1:10 ) = A ( k, 1:10 ) + V ( k:k+9 )
enddo
```

*Fig. 3*

```
real A ( 10, 10 ), V ( 20 )
template T
align A ( i, j ) with T ( i, j )

do k = 1, 10
     realign V ( i ) with T ( k, i-k+1 )
     A ( k, 1:10) = A ( k, 1:10 ) + V ( k:k+9 )
enddo
```

*Fig. 4*

METHOD OF COMPILATION OPTIMIZATION USING AN N-DIMENSIONAL TEMPLATE FOR RELOCATED AND REPLICATED ALIGNMENT OF ARRAYS IN DATA-PARALLEL PROGRAMS FOR REDUCED DATA COMMUNICATION DURING EXECUTION

FIELD OF THE INVENTION

This invention relates to compiling programs written in data parallel languages (sometimes referred to herein as "array parallel languages") for execution on computers having distributed memory, parallel processor architectures and, more particularly, to improved compiler optimization techniques for reducing the amount of residual communication that is required to bring operands of parallel operations into alignment with each other in the executable code.

BACKGROUND OF THE INVENTION

As is known, when a data-parallel language, such as Fortran 90, is compiled for a distributed-memory, parallel processor computer, aggregate data objects, such as arrays, are distributed across the processor memories. This mapping determines the amount of residual communication needed to bring operands of parallel operations into alignment with each other. A common approach is to break the mapping into two stages: first, an "alignment" phase that maps all the objects to an abstract template in a Cartesian index space, and then a "distribution" phase that maps the template to the processors. The alignment phase positions all array objects in the program with respect to each other so as to reduce realignment communication cost. Then, the distribution phase distributes the template aligned objects to the processors. Thus, it will be understood that this two-phase mapping separates the language issues from the machine issues, with the result that the alignment of the data objects is machine independent. A mapping of this type is used in Fortran D, High Performance Fortran, and CM-Fortran.

An important goal of an optimized compilation is to produce data and work mappings that reduce "completion time" (sometimes also referred to as "runtime") Completion time has two components: computation and communication. Communication, in turn, breaks down into two distinct classes: "intrinsic" and "residual" communication. Intrinsic communication arises from computational operations, such as reductions, that require data motion as an integral part of the operation. Residual communication, on the other hand, arises from nonlocal data references required in a computation whose operands are not mapped to the same processors.

This invention focuses on the alignment issue. Thus, to simplify this disclosure, it will be assumed that that data objects are mapped identically to the processors of a computer of the foregoing type if and only if they are aligned. The term "realignment" refers to residual communication due to misalignment, so it is to be understood that an optimization goal is to provide array alignments that minimize realignment cost. For example, communication for transpose, spread, and vector-valued subscript operations can in some cases be avoided, or at least significantly reduced, by suitable alignment choices. This invention causes the communication for such operations to be residual rather than intrinsic, so those operations are subject to the alignment optimization process that is provided by this invention.

Several other workers have considered static alignment. Indeed, the present inventors have published on that subject. This invention extends that work to handle mobile alignment. Knobe, Lukas, and Dally have addressed the issue of dynamic alignment, but their notion of dynamic alignment is limited to quantities that are known only at runtime. As will be seen, this invention extends their work to mobile alignment in the context of loops, where the alignment of an object is an affine function of the loop induction variables (LIVs).

SUMMARY OF THE INVENTION

This invention provides an optimizing compiler for compiling programs written in a data-parallel language for execution on a computer having a distributed memory, parallel processor architecture. This compilation process involves: (1) producing an array-distributed graph representation of the program that is to be compiled; (2) aligning each multi-dimensional array-valued object of that program, so that each axis of each of those objects aligns with a corresponding axis of a N-dimensional template and has a stride which is an integer multiple of the stride of the template along the corresponding axis (where N is the dimensionality of the program object having the greatest dimensionality); (3) replicating some or all of the array-valued objects across one or more axes of the template to minimize the total amount of broadcast communication; (4) finding the offset alignment on each axis of the template, for the origin of each array-valued object relative to the origin of the corresponding axis of said template, that minimizes the total amount of offset communication between the array-valued objects on each of the axes of the template; and (6) dynamically readjusting the offset alignment of objects that participate in iterative control flow to minimize the total amount of offset communication between those objects on each of said axes when summed over every iteration of said control flow.

BRIEF DESCRIPTION OF THE DRAWINGS

Additional features and advantages of this invention will become apparent when the following detailed description is read in conjunction with the attached drawings, in which:

FIG. 3 is a simple Fortran 90 program;

FIG. 4 describes a mobile alignment for the program shown in FIG. 3 through the use of High Performance Fortran directives;

DETAILED DESCRIPTION OF THE ILLUSTRATED EMBODIMENT

While the invention is described in some detail hereinbelow with specific reference to an illustrated embodiment, it is to be understood that there is no intent to limit it to that embodiment. On the contrary, the aim is to cover all modifications, alternatives and equivalents falling within the spirit and scope of the invention as defined by the appended claims.

This disclosure is organized as follows. Section 1 provides a basic overview. Section 2 formalizes the notion of alignment and defines mobile alignment. It also introduces a graph model for dealing with the alignment problem. Section 3 covers mobile stride alignment. Section 4 covers mobile offset alignment for fixed-sized and variable-sized objects and for loop nests. Section 5 describes a process for determining replicated offset alignments. Section 6 provides some additional observations. And, Section 7 provides a more detailed description of the graph model the present invention uses to optimize the alignments.

1. Overview

Figure 1:
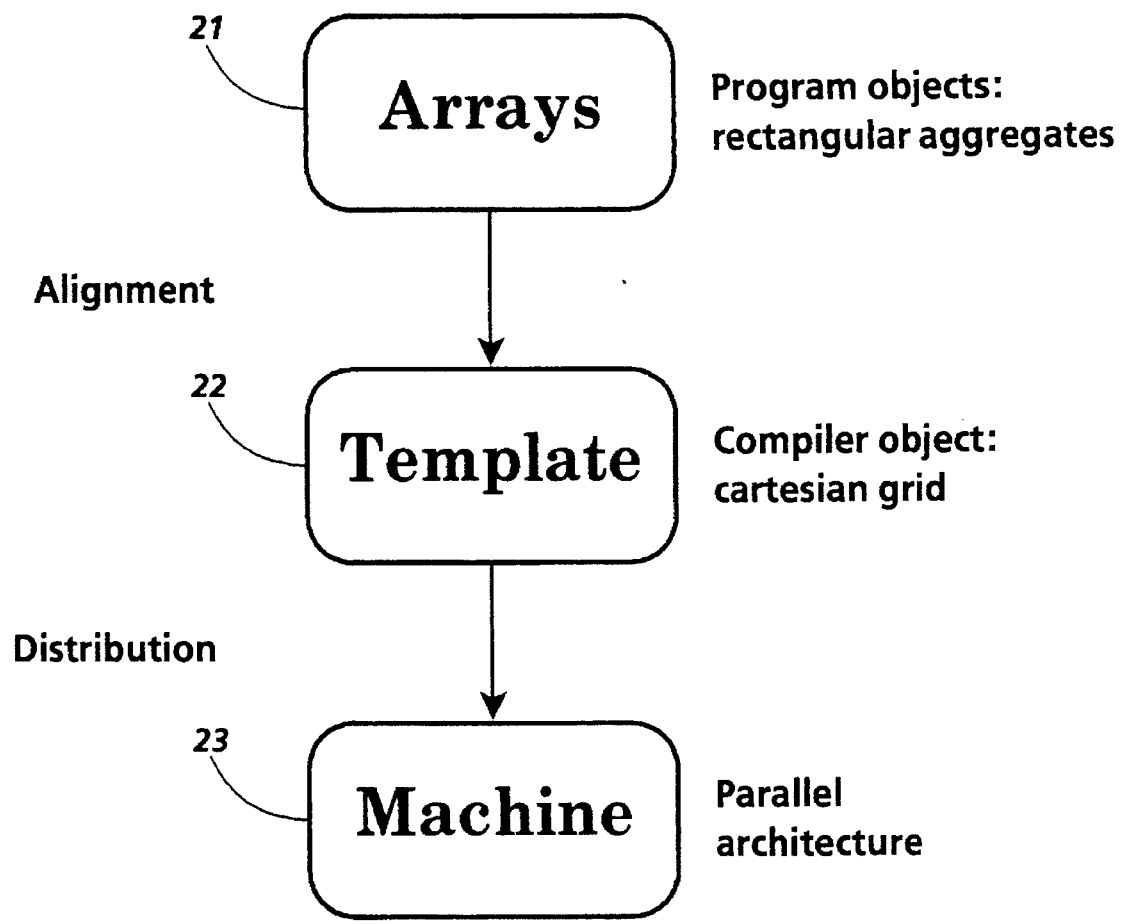
FIG. 1 schematically illustrates a standard two-phase compiler model for mapping program objects that are expressed in array-parallel languages onto the processors of computer having a distributed memory, parallel processor architecture.

As shown in FIG. 1, "alignment" is a mapping that takes each element of any one of the data arrays 21 to a cell of a template 22. The template 22 is a conceptually infinite Cartesian grid because it has as many dimensions as the highest-dimensional array object in the program. In effect, each dimension of the template 22 can be represented by a piece of "graph paper" on which all the array objects in a program are positioned relative to each other. The alignment phase of the compilation process aligns all the array objects 21 of the program to the template 22. The distribution phase then assigns the individual cells of the template 22 to the actual processors of a targetted machine 23.

Figure 2:
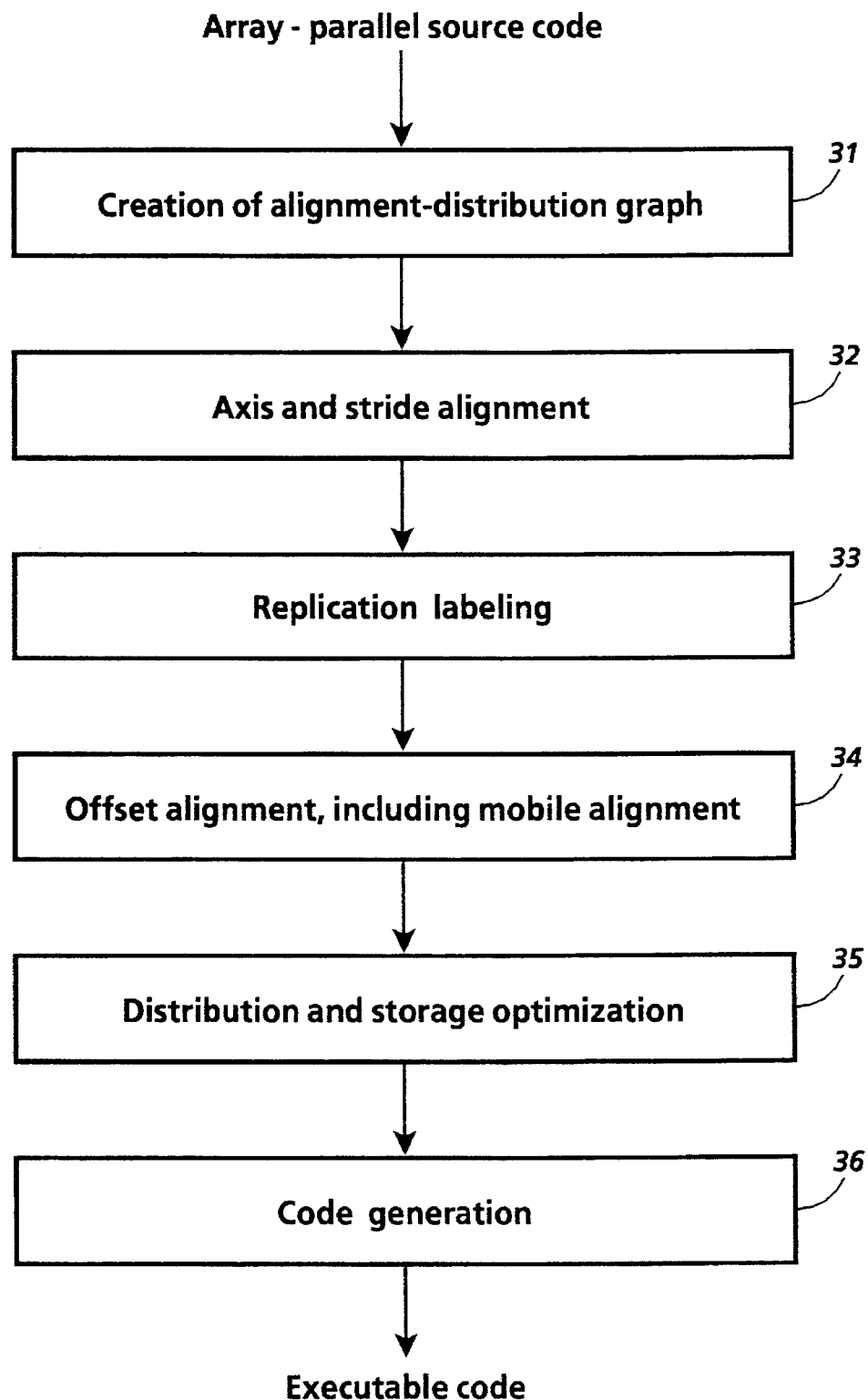
FIG. 2 shows the basic sequence of steps that this invention employs for compiling a program written in an array-parallel language for execution by a computer having a distributed memory parallel processor architecture.
Figure 5A:
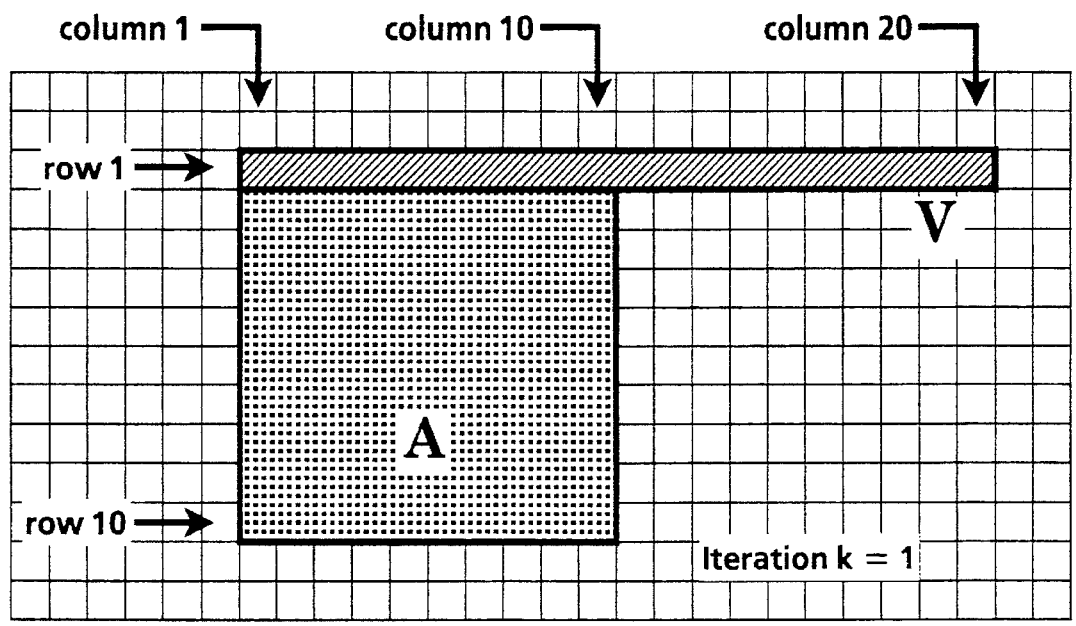
FIGS. 5A and 5B illustrate a mobile alignment for the program shown in FIG. 3 at the first and fifth iterations; respectively, of the "do" loop.
Figure 5B:
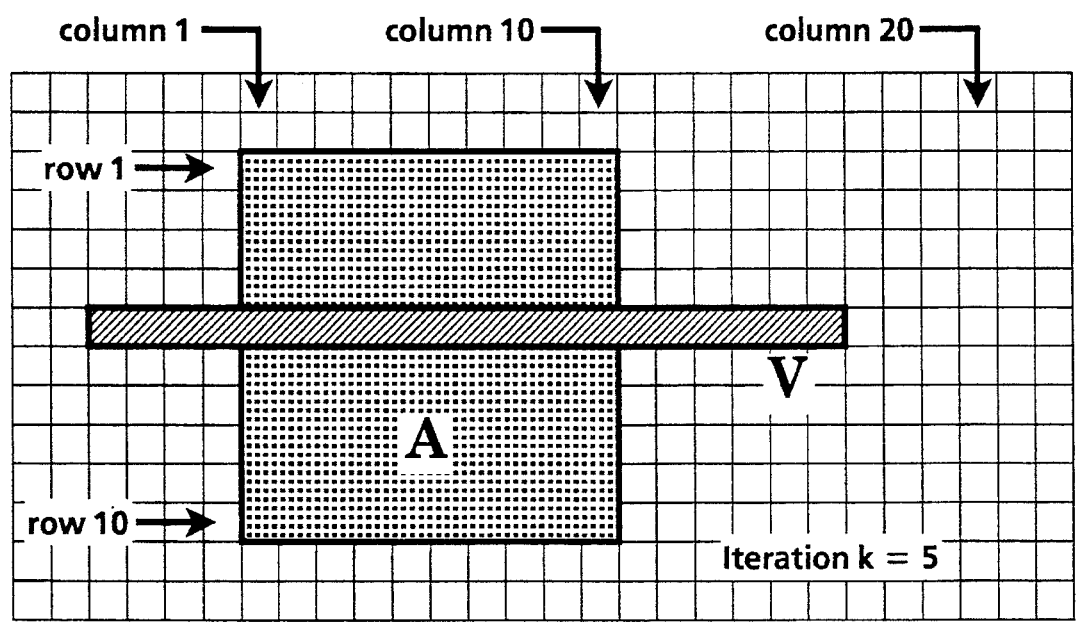

Turning to FIG. 2, the compilation process of the present invention involves a series of steps. First, an alignment distribution graph (ADG) of the source program is generated as at 31. Then, the data objects have their axes and stride aligned with the axes and stride of the template simultaneously for all axis as at 32. Next, a decision is made at 33 as to whether each port of the ADG should be identified as being replicated or non-replicated on one after another of the axes of the template. This often results in a simplification of the ADG because every edge that has a replicated endpoint can be discarded for reasons that are more fully described hereinbelow. As will be seen this replication labeling step 33 minimizes the cost of broadcast communication during program execution. It is not necessary to determine the extent of any replication that is found during this phase of the compilation process. Instead, the extents of the replicated alignments can be generated during the subsequent storage optimization phase (see step 35). Following the replication labeling, offset alignments (including any mobile alignments) are determined for one after another of the axes of the template. Thereafter, as indicated at 35, the template aligned data objects are distributed in accordance with the distribution of the processors in the targetted machines for optimum storage. Finally, a code generation step 36 generates the executable code for the targetted machine.

2. The Alignment Problem

If A is an d-dimensional array, and $f_1$ through $f_t$ are integer-valued functions, then $$A(i_1, \ldots, i_d) \# T[f_1(i_1, \ldots, i_d), \ldots, f_t(i_1, \ldots, i_d)]$$

means that the specified element of A is aligned to the specified element of a t-dimensional template T. Multiple templates may be useful in some cases, but this disclosure considers alignment to a single template. Thus, the template name can be omitted, which yields the somewhat simpler expression $A(i) \# [f(i)]$, where i is a d-vector and f is a function from d-vectors to t-vectors.

Focusing for a moment on alignments in which each axis of a data array maps to a different axis of the template, and array elements are evenly spaced along template axes, it will be evident that such an alignment has three components: axis (the mapping of array axes to template axes), stride (the spacing of array elements along each template axis), and offset (the position of the array origin along each template axis). Each $f_k$ is thus either a constant $o_k$ or a function of a single array index of the form $s_k i_{a_k} + o_k$. The array is aligned one-to-one into the template. As will be seen, this notion is extended in Section 5 below to one-to-many alignments in which an array can be replicated across some template axes.

An array-valued object (object for short) is created by every elemental or transformational array operation and by every assignment to a section of an array. The compilation process of this invention determines an alignment for each object of the program rather than for each program variable. The alignment of an object in a loop may be a function of the loop induction variable; such an alignment is referred to herein as being "mobile."

2.1 Examples

Examples of the various kinds of alignment follow.

Example 1 (Offset alignment). Consider the statement $$A(1:N-1)=A(1:N-1)+B(2:N).$$

If the alignments are $A(i) \# [i]$ and $B(i) \# [i]$, then a one-unit nearest-neighbor shift is necessary. However, the statement can be executed without communication if $A(i) \# [i]$ and $B(i) \# [i-1]$.

Example 2 (Stride alignment) Consider the statement $$A(1:N)=A(1:N)+B(2:2*N:2).$$

If $A(i) \# [i]$ and $B(i) \# [i]$, then general communication is needed to bring A and the section of B together. However, the alignments $A(i) \# [2i]$ and $B(i) \# [i]$ avoid communication.

Example 3 (Axis alignment) Consider the statement $$B=B+transpose(C),$$

where B and C are two-dimensional arrays. If $B(i_1, i_2) \# [i_1, i_2]$ and $C(i_1, i_2) \# [i_1, i_2]$, then general communication is needed to transpose C. However, if $B(i_1, i_2) \# [i_1, i_2]$ and $C(i_1, i_2) \# [i_2, i_1]$, then the operands are aligned, and no communication is necessary.

Example 4 (Mobile offset alignment) Consider the program in FIG. 3. It can be executed optimally if $A(i_1, i_2) \#_k [i_1, i_2]$, and $V(i_1) \#_k [k, i_1, l-k+1]$. We use the symbol $\#_k$ to emphasize the dependence of the alignment on the LIV k.

Example 5 (Mobile stride alignment) Consider the code fragment

```
real A(1000), B(1000), V(20)
do k=1, 50
    V=V+A(1:20*k:k)
    B(1:20*k:k)=V
``` enddo

Furthermore, suppose A(i) $\#_k$[i] and B(i) $\#_k$[i]. If the stride alignment of V is static, then any alignment of V is equally good, with a cost of two general communications per iteration. However, the communication cost drops to one general communication per iteration with the mobile stride alignment V(i) $\#_k$ [ki].

2.2 Alignment-Distribution Graphs

An important tool for carrying out this invention is a modified and annotated data flow graph that is called an "alignment-distribution graph," or ADG for short. This section defines the ADG and shows how to describe the alignment problem as an optimization problem on the ADG. It is to be noted that the ADG is similar in many respects to the static single-assignment form of programs developed by Cytron et al. in "Efficiently Computing Static Single Assignment Form and the Control Dependence Graph," ACM Transactions on Programming Languages and Systems, 13(4): pp. 451–490, October 1991.

Figure 6:
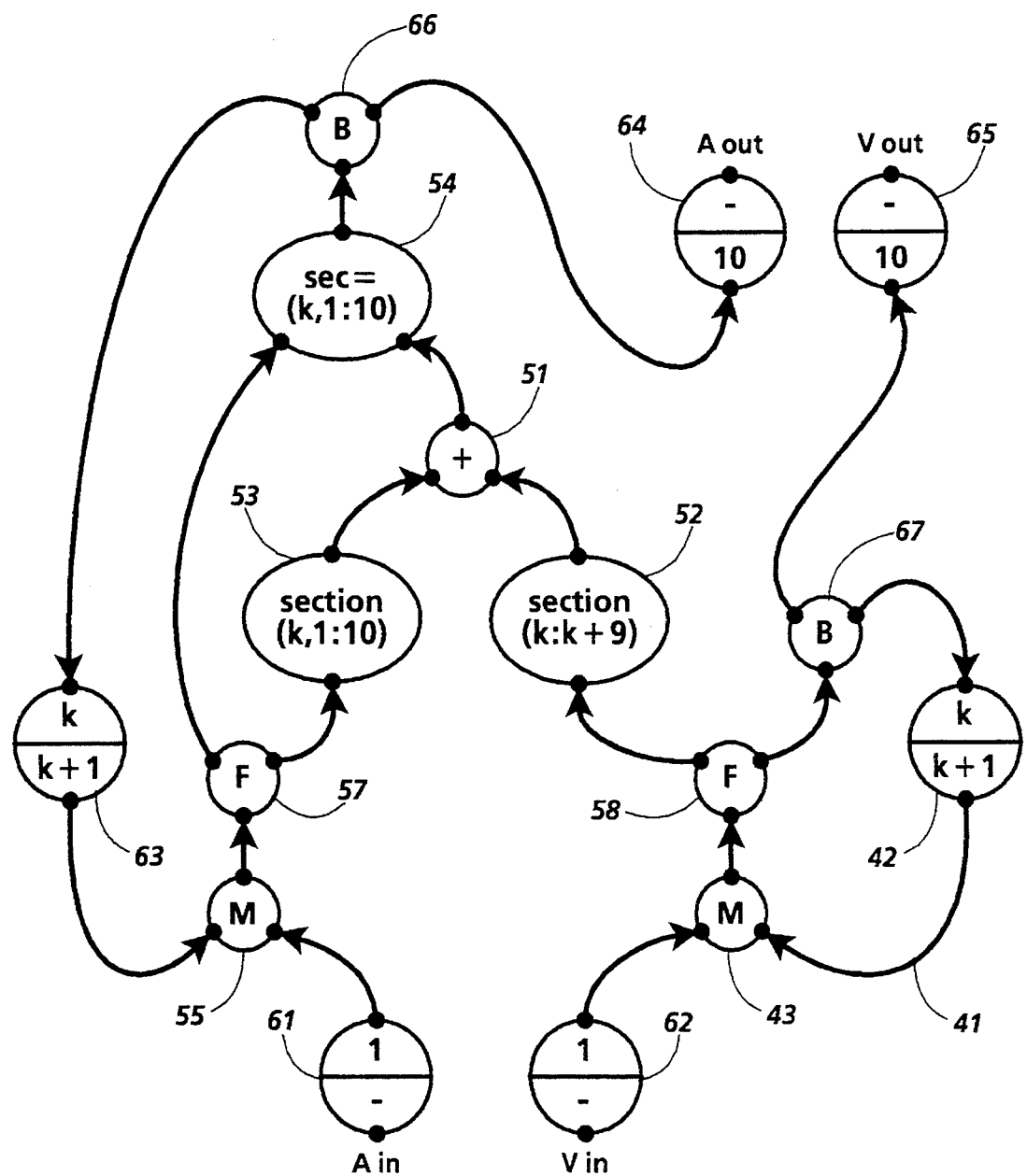
FIG. 6 is an-alignment-distribution graph ("ADG") for the program shown in FIG. 3.
Figure 9:
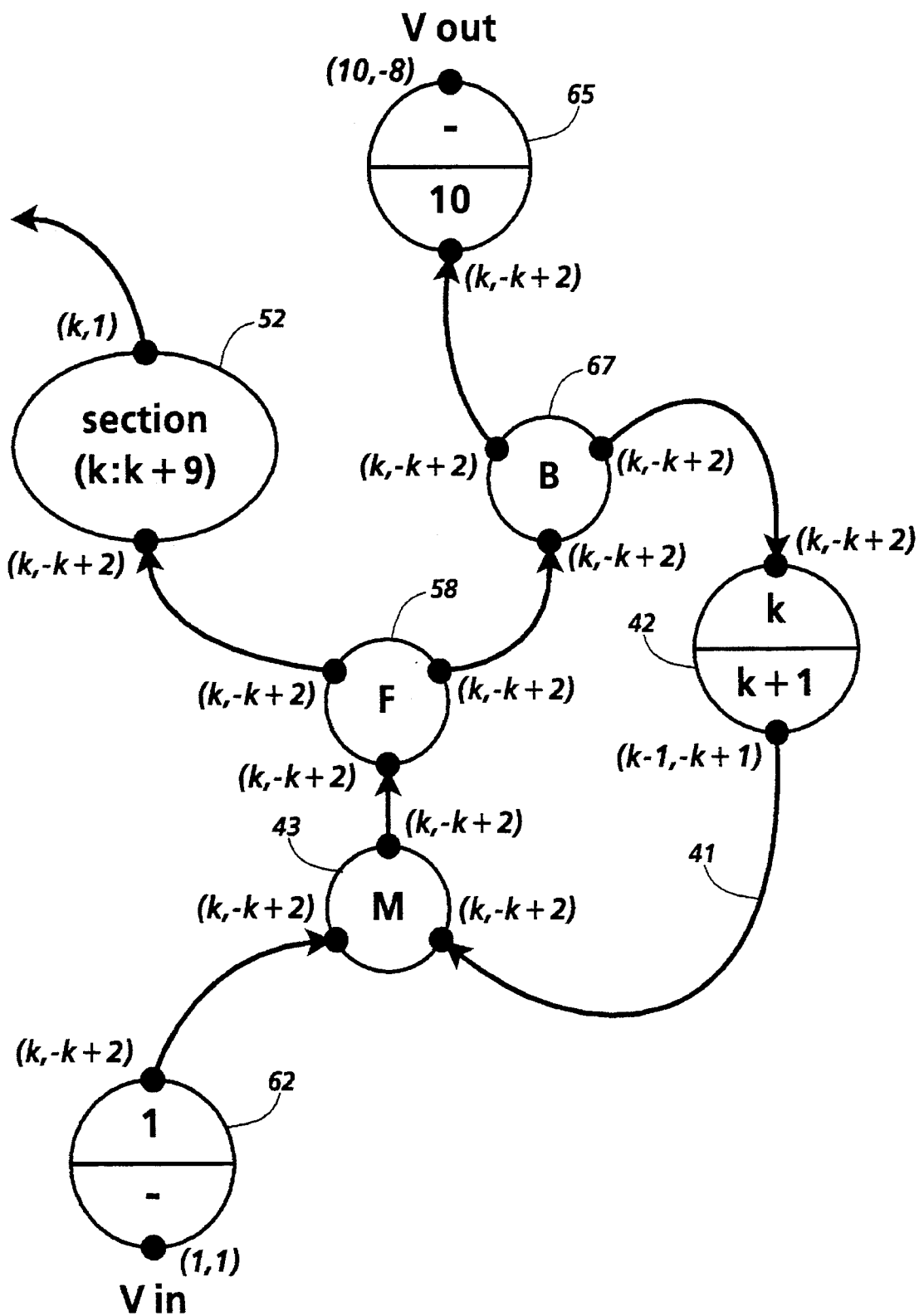
FIG. 9 shows the mobile offset alignments that are provided by this invention for the program fragment covered by FIGS. 7 and 8.

FIG. 6 shows an ADG for the program shown in FIG. 3. Nodes in the ADG represent computation; edges represent flow of data. Alignments are associated with endpoints of edges, which we call ports. A node constrains the relative alignments of the ports representing its operands and its results. An edge carries residual communication cost if its ports have different alignments. The goal is to provide alignments for the ports that satisfy the node constraints and minimize the total edge cost. For example, the only edge that carries residual communication cost in the fragment of the ADG of FIG. 6 that is shown in FIG. 9 is the edge 41 that joins the transformer node 42 to the merge node 43. There is a residual communication cost on edge 41 because it requires a realignment of the operands of the object V from position (k–1, –k+1) to position (k, –k+2)

2.2.1 Edges

The ADG has a port for each (static) definition or use of an object. An edge joins the definition of an object with its use. Multiple definitions or uses are handled with merge and fanout nodes as described below. Thus every edge has exactly two ports. The purpose of the alignment phase is to label each port with an alignment as in FIG. 9. All communication necessary for realignment is associated with edges; if the two ports of an edge have different alignments, then the edge incurs a cost that depends on the alignments and the total amount of data that flows along the edge during program execution.

2.2.2 Nodes

Every array operation is a node of the ADG, with one port for each operand and one port for the result. FIG. 6 contains examples of a "+" node representing elementwise addition as at 51, a "section" node whose input is an array and whose output is a section of the array 52 and 53, and a "section-assign" node 54 whose inputs are an array and a new object to replace a section of the array, and whose output is the modified array. Section-assign is called "Update" by Cytron et al., supra.

FIG. 6 also shows that whenever a single use of a value can be reached by multiple definitions, the ADG contains a "merge node", as at 43 and 55, which has one port for each definition and one port for the use. This node corresponds to the so-called "ø-function" of Cytron et al., supra Conversely, whenever a single definition can reach multiple uses, the ADG contains a "fanout node" as at 57 and 58. Fanout nodes represent opportunities for a so-called Steiner optimization for determining an optimum fanout tree for communicating an object from the position in which it is defined to the positions in which it is used, but the details of that subject are beyond the sope of this invention. Finally, the ADG for a program with loops contains "transformer nodes", as at 42, 61, 62, 63, 64 and 65 in FIG. 6, that delimit iteration spaces as described below, together with branch nodes, as at 66 and 67, for conditionally routing the results of the iterations.

Nodes constrain the alignments of their ports. A node representing an elementwise operation, such as the "+" node 51, constrains all its ports to have the same alignment. Merge, branch and fanout nodes enforce the same constraint.

If A is a two-dimensional array in a two-dimensional template, a node "transpose (A)" (not shown) constrains its output to have the opposite axis alignment from its input, so any communication necessary to transpose the array is assigned to the input or output edges rather than to the node itself. Section and section-assign nodes enforce constraints that describe the position of a section relative to the position of the whole array. For example, the node for the section A(10:50:2) constrains its output to have the same axis as its input, twice the stride of its input, and an offset equal to 10 times the stride of A plus the offset of A.

2.2.3 Iteration Spaces

As will be appreciated, an ADG represents data flow, not control flow. To model communication cost accurately, it must be recognized that data can flow over a particular edge many times during a program's execution, and each time the data object may have a different size.

An edge inside a nest of k loops is labeled with a k-dimensional iteration space, whose elements are the vectors of values taken by the LIVs. Both the size of the data object on an edge and the alignment of the data object at a port are functions of the LIVs, so they may vary over the iteration space.

As previously pointed out, for every edge that carries data into, out of, or around a loop, there is a transformer node, as at 42, 61, 62, 63, 64 and 65 in FIG. 6 to describe the relationship between the iteration spaces at the two ports. A loopback transformer node, in a loop "do i = l:h:s", constrains the alignment of its input as a function of i+s to equal the alignment of its output as a function of i. For example, consider an (k/k+1) transformer node as in FIG. 6. An offset alignment of 2k≠on the input ("k") port and of 2k+1 on the output ("k+1") port satisfies the node's constraints. The (–/1) transformer node on entry to this loop constrains its input position (which does not depend on k) to equal its output position for k=1.

2.3 Cost Model

Figure 7:
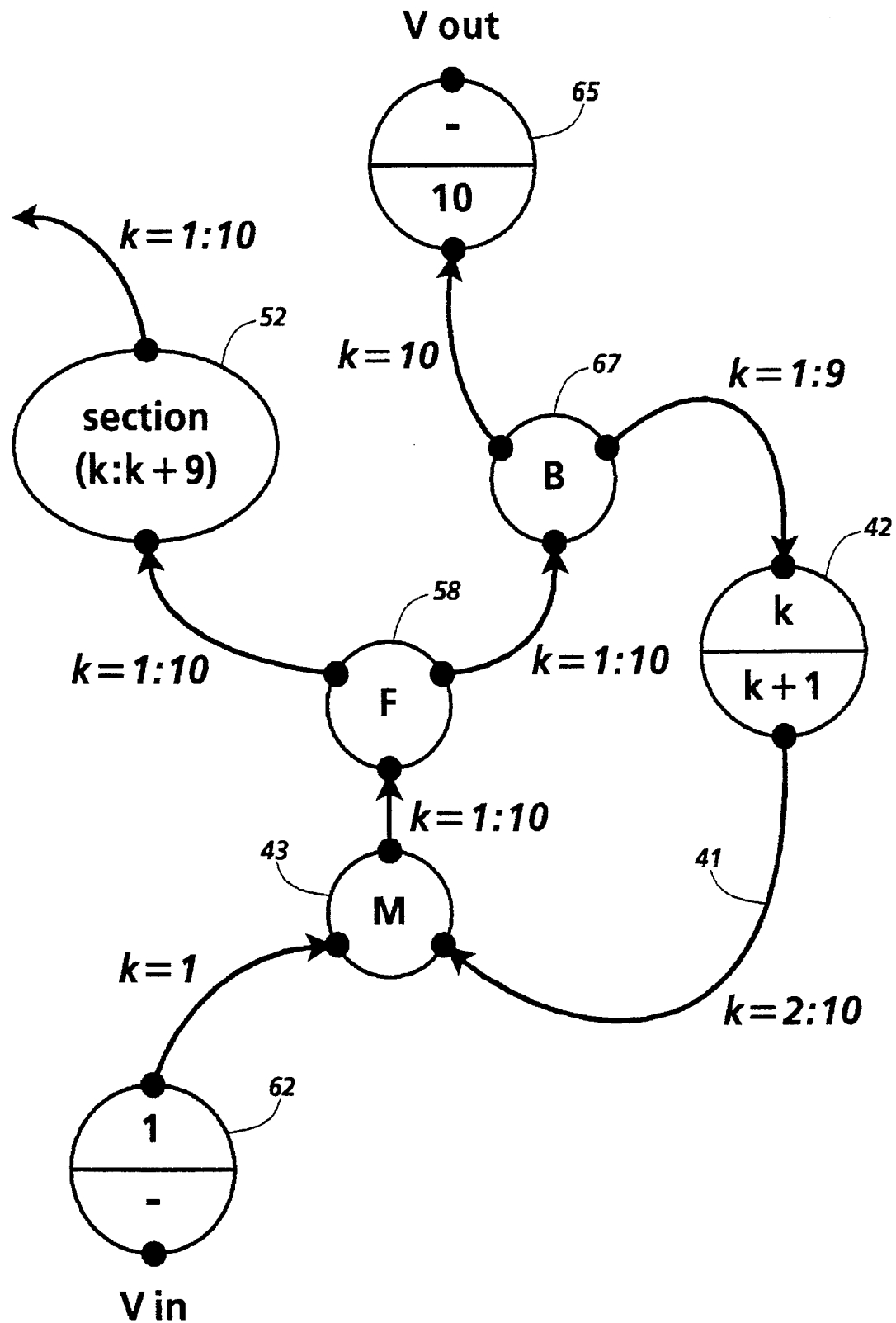
FIG. 7 shows the iteration space labeling of the edges of the ADG for a representative fragment of the program shown in FIG. 3.
Figure 8:
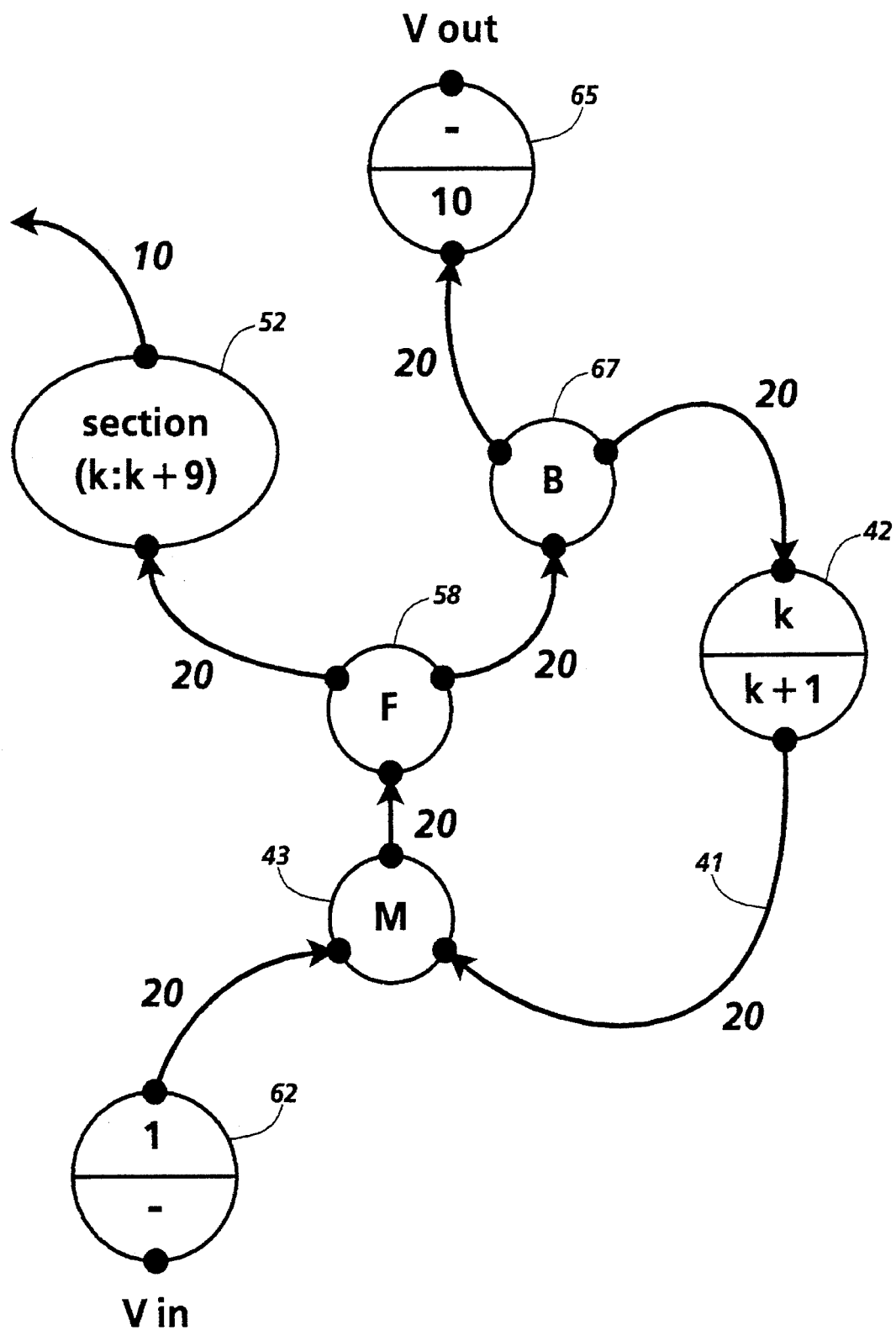
FIG. 8 shows the data weight labeling of the edges of the ADG for the program fragment covered by FIG. 8.

Focusing now on FIGS. 7–9 for a more detailed discussion of the communication cost of the representative program in terms of the ADG. A "position" is an encoding of a legal alignment. Furthermore, the "distance d(p,q)" between two positions p and q is a nonnegative number giving the cost per element to change the position of an array from p to q. Thus, the set of all positions is a metric space under the distance function d.

This disclosure uses the "discrete metric", in which d(p, q)=0 if p=q and d(p,q)=1. In addition, it uses the grid metric, in which p and q are grid points and d(p,q)is the $L_1$ (or Manhattan) distance between them. The discrete metric models axis and stride alignment, since any change of axis or stride requires general communication. The grid metric, on the other hand, models offset alignment. It is to be noted that the grid metric is "separable", which means that the distance between two points in a multidimensional grid is equal to the sum of the distances between their corresponding coordinates in one-dimensional grids. This property permits the offset alignment problem to be solved independently for each axis of the template 22 (FIG. 1).

The communication cost of the program is modeled as follows. Let E be the set of edges of the ADG, and let $I_{xy}$ be the iteration space for edge (x,y). For a vector i in $I_{xy}$, let $w_{xy}(i)$ be the edge weight, which is the size of the data object on edge (x,y) at iteration i. Finally, let π be a feasible mobile alignment for the program—that is, for each port x let $\pi_x(i)$ be an alignment for x at iteration i that satisfies all the node constraints. Then the realignment cost of edge (x,y) at iteration i is $w_{xy}(i) \cdot d(\pi_x(i), \pi_y(i))$, and the total realignment cost of the program is $$C(\pi) = \sum_{(x,y)\in E} \sum_{i\in I_{xy}} \omega_{xy}(i) \cdot d(\pi_x(i), \pi_y(i)). \quad (1)$$

The goal is to choose π to minimize the communication cost, subject to the node constraints.

2.4 Restrictions on Mobile Alignment Functions

So far it has been assumed that the form that mobile alignments may take is unconstrained. In theory, such alignments could be arbitrary functions of the LIVs, but that would be impossible to analyze. Therefore, for reasons of tractability, this invention restricts mobile alignments to be affine functions of the LIVs. Thus, the alignment function for an object within a k-deep loop nest with LIVs $i_1, \ldots, i_k$ is of the form $\alpha_0 + \alpha_1 i_1 + \ldots + \alpha_k i_k$, where the coefficient vector $\alpha = (\alpha_0, \ldots, \alpha_k)$ is what must be determined. This alignment can be expressed succinctly in vector notation as $\alpha i^T$, where $i = (1, i_1, \ldots, i_k)$. Both α and i are (k+1)-vectors. As will be appreciated, this reduces to the constant term $\alpha_0$ for an object outside any loops.

Likewise, the extents of objects are restricted to be affine in the LIVs, so that the size of an object is polynomial in the LIVs.

3. Mobile Stride Alignment

The discrete metric is used to model communication costs arising from stride changes. Let the strides at the ports of an edge be $\alpha i^T$ and $\alpha' i^T$. If a =a', then the ports will be aligned at every iteration. Conversely, if the constant terms $\alpha_0$ and $\alpha'_0$ differ, but all other components are equal, then the ports are always misaligned. In all other cases, the ports of the edge are almost always misaligned. Thus, it is assumed that objects are misaligned in all iterations unless α=α'.

As the distance function in equation (1) is independent of the LIV, it can be moved outside the summation over the iteration space, thereby permitting the communication cost of edge (x,y) to be expressed as the product of a weight and a distance. The distance is the discrete metric on (k+1)-vectors, while the weight is the sum over all iterations of the size of the object at each iteration, $W = \sum_{i \in I_{xy}} w_{xy}(i)$. Since the weight is polynomial in the LIVs, the sum can be evaluated in closed form. Compact dynamic programming, a technique previously developed for static axis and stride alignment (See Chatterjee et al., "Automatic Array Alignment in Data-Parallel Programs, Proceedings of the Twentieth Annual ACM SIGACT/SIGPLAN Symposium on Principles of Programming Languages, pp. 16–28, Jan. 1993. Also available as RIACS Technical Report 92.18.3) is suitable for solving this problem.

4. Mobile Offset Alignment

Consider an object with offset alignment $ai^T$. Since the problem is separable, offsets can be determined with respect to one template axis at a time. If there are no loops in the code, the solution reduces to our earlier solution for static offset alignment. See Chatterjee et al. supra.

The contribution of edge (x, y) to the residual communication is $$C_{xy} = \sum_{i\in I_{xy}} \omega_{xy}(i)|(a-a')i^T|, \quad (2)$$

where $\pi_x = a$, $\pi_y = a'$, and $I_{xy}$ is the iteration space associated with the edge. Even if $w_{xy}(i)$ is constant, the absolute value in equation (2) makes its closed form complicated. Therefore, rather than providing an algorithm for minimizing this cost function, it is preferred to approximate it by one for which the solution is straightforward.

4.1 Offset Alignment by Linear Programming

As more fully described by Chatterjee et al., supra, the static offset alignment problem for the grid metric can be reduced to linear programming. For example, let the integer $\pi_x$ be the offset alignment of port x. Then the residual communication cost (i.e., the function that is to be minimized) is $C(\#) = \sum_{(x,y)\in E} C_{xy}(\pi)$. Consequently, $$C(\pi) = \sum_{(x,y)\in E} \omega_{xy}|\pi_x - \pi_y|.$$

As will be recalled, nodes in the ADG introduce linear equality constraints. Thus, to remove the absolute value from the objective function, a variable $\theta_{xy}$ is introduced for every edge (x,y) of the ADG, and two inequality constraints are added, such that $$\theta_{xy} + \pi_x - \pi_y \geq 0$$

$$\theta_{xy} - \pi_x + \pi_y \geq 0,$$

This guarantees that $\theta_{xy} \geq |\pi_x - \pi_y|$. Accordingly, the objective function of the preceeding equation becomes $$\sum_{(x,y)\in E} \omega_{xy}\theta_{xy}.$$

The transformed equation is equivalent to the original one, because $\theta_{xy} = |\pi_x - \pi_y|$ at optimality. As will be seen, the transformation introduces |E| new variables and 2|E| new constraints.

If the offsets that result from the linear program are fractional, they are rounded to integers. The rounded solutions are not necessarily optimal integer solutions. Indeed in general, rounding a linear programming (LP) solution may not even preserve feasibility. However, in the case of offset alignment with the grid metric, it can be shown that rounding is a reasonable approach. Clearly, it is straightforward to round the offsets so as to satisfy all the node constraints. Moreover, the template 22 (FIG. 1) can be thought of as a discrete approximation to a continuous $L_1$ metric space in which the edge costs are continuous functions of real-valued offsets. The unrounded LP optimizes this problem exactly, so it is believed that the discrete optimum is not very sensitive to rounding. For convenience, this algorithm is referred to as rounded linear programming, or RLP. In passing it is noted that experimentation with the use of mixed integer linear programming also seems to be very efficient in this context.

4.2 Fixed-Size Objects and Singly-Nested Loops for Mobile Offset Alignment

Assume for this section that the data weight of edge (x, y) is constant and (wlog) equal to 1, and that $I_{xy} = l:h:s$. Let $(\alpha - \alpha')i^T$ be called the span of edge (x,y). It then will be apparent that if the span does not change sign in the interval [I, h], the summation and the absolute value in equation (2)

above are interchangeable. In other words, under the foregoing circumstances, $C_{xy} = |\Sigma_{i \in l:h:s}(\alpha - \alpha')i^T|$, the closed form for which is $$C_{xy} = \frac{h - l + s}{s} \left| (a_0 - a'_0) + \frac{l + h}{2} (a_1 - a'_1) \right|. \quad (3)$$

Note that the term inside the absolute value in Equation (3) is the average distance spanned by edge (x,y). This reduces to RLP with one new variable per edge.

In general, however, the span may change sign in the iteration space, so interchanging the summation and the absolute value is a potential source of error. Thus, to limit the error, the iteration space is partitioned into m equal subranges $I_1, \ldots, I_m$, such that each subrange corresponds to a set of consecutive iterations. The communication cost then decomposes as follows:

$$C_{xy} = \sum_{j=1}^{m} \sum_{i \in I_j} |(a - a')i^T|. \quad (4)$$

Therefore, an assumption that the span does not change sign within any subrange leads to the approximate cost model $$C_{xy} \approx \tilde{C}_{xy} = \sum_{j=1}^{m} \left| \sum_{i \in I_j} |(a - a')i^T| \right|. \quad (5)$$

Then, to fix m, the outer sum of Equation (5) is expanded explicitly, and each inner sum is evaluated using equation (4). Clearly, the span can change sign in at most one subrange; therefore, at least (m−1) of the subrange sums are correct. Consequently, these sums reduce to RLP with m new variables per edge. The possible error of the RLP solution is bounded because the communication cost C at the RLP aproximate solution exceeds the cost at the best possible solution by at most a factor of $(1+2/m^2)$. Moreover, if desired, this bounding error may be even further reduced by using unequal intervals.

The discussion above suggests several possible algorithms for solving the mobile offset alignment problem, including:

1. Unrolling: Every iteration is defined as a subrange, and RLP is used. As will be apparent, this is equivalent to unrolling the loop. It is exact, but it is clearly impractical unless the number of iterations is small.

2. State space search: Approximate the iteration space as a single subrange, and use RLP. Using this solution as an initial guess, optimize the exact cost equation (4) by, for example, steepest descent.

3. Tracking zero crossings: Split the iteration space into two equal subranges, and use RLP. If $\rho_{xy}$ has a zero crossing in the range, locate it, and move the subrange boundaries to coincide with this point. Now solve the new RLP and iterate until convergence. This solves a sequence of fixed-size problems, each with 2|E| new variables. Convergence of this method is not guaranteed.

4. Recursive refinement: Approximate the iteration space as a single subrange, and use RLP. Now examine the solution to determine subranges (at most one per edge) in which $\rho_{xy}$ has a zero crossing. Break each subrange in two at the zero crossing, and formulate and solve a new RLP. Continue the refinement until some stopping criterion is satisfied (e.g., until there are no more subranges to be refined, or until the objective function shows no further improvement, or until the available time has expired). As will be appreciated, this technique requires solving a sequence of progressively larger problems.

5. Fixed partitioning: Partition the iteration space into three subranges, and use RLP. The resulting solution is guaranteed to be within 22% of optimal. This requires solving a single problem with 3|E| new variables. It is to be noted that, the error bound varies as an inverse function of the number of partitions. For example, a five-way partition reduce the error bound to 8%. This algorithm is favored because it is a good compromise between speed, reliability, and quality.

4.3 Variable-Size Objects in Singly-Nested Loops for Mobile Alignment

Assume for the moment that $I_{xy} = l:h:s$ and that the data weight of edge (x, y) at iteration i is $\beta_0 + \beta_1 i$, where $\beta_0$ and $\beta_1$ are integer constants. Then the communication cost of the edge is $$C_{xy} = \sum_{i \in l:h:s} (\beta_0 + \beta_1 i)|(a - a')i^T|.$$

Now, define the following moments:

$$\sigma_0 = \sum_{i \in l:h:s} 1.$$

$$\sigma_1 = \sum_{i \in l:h:s} i = (s\sigma_0^2 + (2l - s)\sigma_0)/2$$

$$\sigma_2 = \sum_{i \in l:h:s} i^2 = (2s^2\sigma_0^3 + (6sl - 3s^2)\sigma_0^2 + (6l^2 - 6sl + s^2)\sigma_0)/6.$$

Then, if the span does not change sign in [l, h], the communication cost of edge (x,y) is $$C_{xy} = |(\beta_1\sigma_1 + \beta_0\sigma_0)(\alpha_0 - \alpha'_0) + (\beta_1\sigma_2 + \beta_0\sigma_1)(\alpha_1 - \alpha'_1)|. \quad (6)$$

This means that the alignment coefficients for variable-size objects in singly-nested loops can be determined as in Section 4.2.

4.4 Loop Nests

The optimization method of the present invention generalizes to loop nests as follows. As previously pointed out, the index range for each LIV is suitably divided into three subranges. The Cartesian product of this decomposition divides the iteration space into $3^k$ subranges, over each of which it is assumed that there is no sign change in the span. Thus, the cost over each subrange is summed, thereby yielding one term in the approximate cost. It then is possible to solve for the minimizer of the approximate cost as in Section 4.2.

For a k-deep loop nest, the problem has $3^k|E|$ variables. The above technique, therefore, does not scale well for deep loop nests. However, this is not expected to be a problem, at least for the compilation of Fortran 90, where array operations and for all loops are used to express in parallel what would be loop code in a sequential language.

The Cartesian product formulation handles imperfect and trapezoidal loop nests quite naturally. The key to this is the transformer nodes that bridge the different levels of the loop nest.

5. Replication

Up to this point, this disclosure has treated alignment as being a one-to-one mapping from an array-valued object 21 to the template 22 (FIG. 1). If this definition is relaxed to include a one-to-many mapping, the notion of "replication" can be introduced. More particularly, replication is defined as being an offset alignment that is a set of positions rather than a single position. The following discussion of this topic will restrict the possible sets of positions to be triplets l:h:s.

As will be appreciated, a d-dimensional object aligned to a t-dimensional template has d "body axes" (which require axis, stride, and offset alignments) and (t-d) "space axes" (which require only an offset alignment). The notion of replication that is used herein allows the offset alignment along a space axis of an object to be a regular section of the corresponding template axis. The symbol * will be used to indicate replication across an entire template axis. For example, A(i) # [i,10] aligns A with one position along the second template axis; A(i) # [i, 10:20:2] aligns A with a subset of the second template axis; and A(i) # [i*] replicates A across all of the second template axis. A broadcast communication occurs on any edge along which data flows from a fixed offset to a replicated offset.

5.1 Replication Labeling

Offset alignment begins with a phase called "replication labeling," whose purpose is to decide which ports of the ADG should have replicated positions. The algorithm that is proposed in this section for replication labeling labels ports as being replicated or non-replicated, but does not determine the extent of replication. Instead, as previously pointed out, it is preferred to generate the extents of replicated alignments in a storage optimization phase that follows replication.

There are three sources of replication:

1. A "spread" operation causes replication.
2. The use of lookup tables indexed by vector-valued subscripts is more efficient if the lookup table is replicated across the processors. (However, it is advisable to replicate such tables only with the programmer's permission.)
3. A read-only object with mobile offset alignment in a space axis can be realized through replication.

Given these sources, the goal is to determine which other objects should be replicated, in order to minimize broadcast communication during program execution. This problem can be modeled as a graph labeling problem with two possible labels (replicated, non-replicated), and it can be shown that it can be solved efficiently as a min-cut problem.

The simple program

```
real A(100), B(100,200)
do K=1,200
    A = cos(A)
    B = B + spread (A, dim =2, ncopies =200)
enddo
``` shows why replication labeling is useful. In this example, a broadcast will occur in every iteration if A is not replicated, while a single broadcast will occur (at loop entry) if it is replicated. This is the solution found by the method of the present invention.

After replication labeling, every edge with a replicated endpoint is discarded from the ADG (FIG. 6), thereby enabling the offsets to be found for the nonreplicated ports as described in Section 4. The justification for this simplification of the ADG is that an edge whose tail is replicated requires no communication, while an edge whose head is replicated requires the same amount of communication regardless of the offset of the (non-replicated) tail.

5.2 Labeling by Network Flow

As will be recalled, offsets are determined independently for each axis of the N-dimensional template 22 (FIG. 1), where N is the dimensionality of the program array having the greatest dimensionality. Thus, the axis that is being labelled at any given time conveniently is referred to as the "current axis." Every port of the ADG (FIG. 6) must be labelled either "replicated" (R) or "non-replicated" (N). Furthermore, the constraints on this labeling are as follows:

1. A port for which the current axis is a body axis has label N.
2. The node for a spread along the current axis has its input port labeled R and its output port labeled N.
3. A port for a read-only object with a mobile alignment in the current axis, and for which the current axis is a space axis, has label R.
4. Some other ports have specified labels, such as ports at subroutine boundaries, and ports representing replicated lookup tables.
5. At every other node, all ports must have the same label.

As shown in FIG. 8 each ADG edge has a weight that is the expected total communication cost (over time) of having the tail non-replicated and the head replicated. This edge weight is therefore the sum over all iterations of the size of the object communicated.

The object is to determine the labeling that satisfies the labeling constraints, while minimizing the sum of the weights of the edges directed from N to R ports. As more fully described hereinbelow, this is a min-cut problem that can be solved by standard network flow techniques.

Theorem 1 An optimal replication labeling can be found by network flow.

Proof: A weighted, directed graph G, which is a slightly modified version of the ADG, can be defined such that the vertices of G are as follows: each node of the ADG except current-axis spreads is a vertex of G. If the node has a port labeled N or R, the vertex of G has the same label. (No node except a current-axis spread can have two ports with different labels.) Each current-axis spread corresponds to two vertices of G, one for each port, with the input-port vertex labeled R and the output-port vertex labeled N. Finally, G has a new source vertex s labeled N and a new sink vertex t labeled R. The edges of G are as follows: Each directed edge of the ADG corresponds to an edge of G with the same weight. Also, there is a directed edge of infinite weight from the source s to every vertex with label N, and a directed edge of infinite weight from every vertex with label R to the sink t.

A cut in the above defined weighted directed graph G is a partition of its vertices into two sets X and $\overline{X}$, with s $\Sigma$ X and t $\Sigma$ $\overline{X}$. The cost of a cut is the total weight of the edges that cross it in the forward direction, that is, the total weight of directed edges (x,y) with x $\Sigma$ $\overline{X}$ and y $\Sigma$ $\overline{X}$.

Every replication labeling is a cut, and the cost of the labeling is the same as the cost of the cut. Every cut of finite cost is a replication labeling (since no infinite-cost edge can cross it in the forward direction), and hence a minimum-cost cut is an optimum replication labeling. The max flow/min cut theorem of Papadimitriou et al, Combinatorial Optimization: Algorithms and Complexity. Prentice-Hall, Inc., 1982, (Theorem 6.2) shows that the cost of a minimum cut is the same as the value of a maximum flow from the source to the sink.

Both the max flow and the min cut can be found in low-order polynomial time by any of several known algorithms. In particular, this max flow/min-cut problem can be solved using linear programming. This is ideal for this invention, because the above-described implementation of the invention already relies upon a linear programming package for determining mobile offset alignments. The linear programming solution is less efficient asymptotically than other methods, but should be adequate for present purposes.

6. Additional Observations

Compiler optimizations for determining replication and mobile offsets within loops have been described hereinabove. It also has been shown that an optimal replication labeling can be found by network flow. Moreover, for mobile alignment, an approximate reduction to rounded linear programming has been presented, with error bounds on the solution quality.

In theory, the framework for determining mobile offset alignment in accordance with this invention can be extended to handle user-defined runtime functions. One way to accomplish this is to incorporate such functions in the offset alignment, and treat a mismatch in positions as a shift of unknown distance. That permits the use of techniques similar to those described in Section 4 to solve the mobile offset alignment problem for user-defined runtime functions.

While the foregoing disclosure concentrates on loop programs, it provides a framework that can deal with arbitrary control flow. More particularly, the known static single-assignment form can be constructed for programs with arbitrary control flow graphs. Thus, in the presence of arbitrary control flow, a control dependence graph (see Cytron, et al., supra) can be employed to associate a probability $P(e)$ of execution with every edge $e$ of the ADG, and to minimize the "expected realignment cost"

$$\sum_{(x,y) \in E} \sum_{i \in I_{xy}} P(x,y,i) \cdot \omega_{xy}(i) \cdot d(\pi_x(i), \pi_y(i)).$$

7. More on the Alignment-Distribution Graph (ADG)

At the risk of creating some redundancy, the following lightly edited excerpts from a soon to be published technical paper are included primarily for the benefit of those who desire more detail on the ADG. As will be recalled, the ADG uses new techniques to represent the residual communication due to loop-carried dependences, assignment to sections of arrays, and transformational array operations such as reductions and spreads. The ADG provides a detailed and realistic model of residual communication cost that accounts for a wide variety of program features. Moreover, it allows the alignment and distribution phases of the compilation process to be hndled as discrete optimization problems.

The remainder of the section is organized as follows. Subsection 7.1 motivates and formally describes the ADG representation of programs. Subsection 7.2 describes how the ADG is used to model the communication cost of a program.

Subsection 7.3 discusses approximations that we make in the model presented in Subsection 7.2 for reasons of practicality. Lastly, Subsection 7.4 outlines some algorithms for alignment analysis that use the ADG.

7.1 The ADG Representation of Data-Parallel Programs

The ADG is a directed graph representation of data flow in a program. Nodes in the ADG represent computation; edges represent flow of data. Alignments are associated with endpoints of edges, which we call ports. A node constrains the relative alignments of the ports representing its operands and its results. Realignment occurs whenever the ports of an edge have different alignments. The goal of alignment analysis is to determine alignments for the ports that satisfy the node constraints and minimize the total realignment cost, which is a sum over edges of the cost of all realignment that occurs on that edge during program execution.

Similar mechanisms can be used for determining distributions. In the distribution analysis method that we foresee, each object in use at a node has a unique distribution onto processors at that node. The distributions are chosen to minimize an execution time model that accounts for redistribution cost (again associated with edges of the ADG) and computation cost, associated with nodes of the ADG and dependent on the distribution as well. For the remainder of this section, however, we focus on alignment analysis.

The ADG distinguishes between program array variables and array-valued objects in order to separate names from values. An array-valued object (object for short) is created by every elemental or transformational array operation and by every assignment to a section of an array. Assignment to a whole array, on the other hand, names an object. The algorithms presented in Subsection 7.4 determine an alignment for each object in the program rather than for each program variable.

7.1.1 A Summary of SSA Form

A program is in SSA form if each variable is the target of exactly one assignment statement in the program text (Cytron et al, supra). Any program can be translated to SSA form by renaming variables and introducing a special form of assignment called a $\phi$-function at some of the join nodes in the control flow graph of the program. Cytron et al. present an efficient algorithm to compute minimal SSA form (i.e., SSA form with the smallest number of $\phi$-functions inserted) for programs with arbitrary control flow graphs.

In common usage, SSA form is usually defined for sequential scalar languages, but this is not a fundamental limitation. It can be used for array languages if care is taken to properly model references and updates to individual array elements and array sections(see Cytron et al., supra, at §3.1). The ADG uses SSA form in this manner.

A major contribution of SSA form is the separation between the values manipulated by a program and the storage locations where the values are kept. This separation, which allows greater opportunities for optimization, is the primary reason for basing the ADG on SSA form. After optimization, the program must be translated from SSA form to object code. Cytron et al. discuss two optimizations (dead code elimination and storage allocation by coloring) that produce efficient object code (Cytron et al., supra, at §7).

7.1.2 Ports and Alignment

The ADG has a port for each textual definition or use of an object. Ports are joined by edges as described below. The ports that represent the inputs and output of a program operation are grouped together to form a node. Some ports are named and correspond to program variables; others are anonymous and correspond to intermediate values produced by the computation.

The principal attribute of a port is its alignment, which is a one-to-one mapping of the elements of the object into the cells of a template. We use the notation $$A(\theta_1, \ldots, \theta_d) \# [g_1(\theta_1, \ldots, \theta_d), \cdots, g_t(\theta_1, \ldots, \theta_d)]$$

to indicate the alignment of the d-dimensional object A to the t-dimensional (unnamed) template. The formula above has d implicit universal quantifiers to its left, one for each of the index variables $\theta_1$ through $\theta_d$.

When we consider an object defined or used in a nest of do loops with induction variables (LIVs) $\xi_1, \ldots, \xi_k$, we extend the notation to $$A(\theta_1, \ldots, \theta_d) \#_\xi [g_1(\theta_1, \ldots, \theta_d), \cdots, g_t(\theta_1, \ldots, \theta_d)]$$

where $\xi = (1, \xi_1, \ldots, \xi_k)$, and each $g_k$ is now a function of

ξ. The additional 1 at the beginning of ξ provides a smooth transition to an object outside any loops.

In this notation, the index variables are universally quantified, but the induction variables are free. Such an alignment is said to be mobile.

High Performance Fortran allows a program to use more than one template. We have extended our theory to use multiple templates, but in this section, for simplicity, we assume that all array objects are aligned to a single template.

We restrict our attention to alignments in which each axis of the object maps to a different axis of the template, and elements are evenly spaced along template axes. Such an alignment has three components: axis (the mapping of object axes to template axes), stride (the spacing of successive elements along each template axis), and offset (the position of the object origin along each template axis). Each $g_j$ is thus either a constant $f_j$ (in which case the axis is called a space axis), or a function of a single array index of the form $s_j \theta_{aj} + f_j$ (in which case it is called a body axis). There are d body axes and (t - d) space axes. We allow the stride and offset components to be functions of the induction variables in the mobile case. In matrix notation, the alignment gA (θ) of object A can be written as $g_A(\theta) = L_A \theta + f_A$, where $L_A$ is a t×d matrix whose columns are orthogonal and contain exactly one nonzero element each, $f_A$ is a t-vector, and $\theta = (\theta_1, \ldots, \theta_d)^T$. The elements of $L_A$ and $f_A$ are expressions in ξ. The nonzero structure of $L_A$ gives the axis alignment, its nonzero values give the stride alignment, and $f_A$ gives the offset alignment.

We also allow replication of objects. The offset of an object in a space axis of the template, rather than being a scalar, may be a set of values. We restrict our attention to sets that can be represented by triplets l:h:s.

7.1.3 Edges, Iteration Spaces, and Control Weights

An edge in the ADG connects the definition of an object with a use of the object. Multiple definitions or uses are handled with merge, branch, and fanout nodes as described below. Thus every edge has exactly two ports. The purpose of the alignment phase is to label each port with an alignment. All communication necessary for realignment is associated with edges; if the two ports of an edge have different alignments, then the edge incurs a cost that depends on the alignments and the total amount of data that flows along the edge during program execution. An edge has three attributes: data weight, iteration space, and control weight.

The data weight of an edge is the size of the object whose definition and use it connects. As the objects in our programs are rectangular arrays, the size of an object is the product of its extents. If an object is within a loop nest, we allow its extents, and hence its size, to be functions of the LIVs. We write the data weight of edge (x, y) at iteration ξ as $w_{xy}(\xi)$.

The ADG is a static representation of the data flow in a program. However, to model communication cost accurately, we must take control flow into account. The branch and merge nodes in the ADG are a static representation, in a data-oriented model, of the forks and joins in control flow. Control flow has two effects: data may not always flow along an edge during program execution (due to conditional constructs), and data may flow along an edge multiple times during program execution (due to iterative constructs). An activation of an edge is an instance of data flowing along the edge during program execution. To model the communication cost correctly, we attach iteration space and control weight attributes to edges.

First consider a singly nested do-loop. Data flows once along the edges from the preceding computation into the loop, along the forward edges of the loop at every iteration, along the loop-back edges after all but the last iteration, and once, after this last iteration, out of the loop to the following computation. Summing the contribution of each edge over its set of iterations correctly accounts for the realignment cost of an execution of the loop construct. In general, an edge (x,y) inside a nest of k do-loops is labeled with an iteration space $I_{xy} \subset Z^{k+1}$, whose elements are the vectors ξ of values taken by the LIVs. As explained above, both the size of the object on an edge and the alignment of the object at a port can be functions of the LIVs. The realignment and redistribution cost attributed to an edge is the sum of these costs over all iterations in its iteration space.

For a program where the only control flow occurs in nests of do-loops, iteration spaces exactly capture the number of activations of an edge. However, programming languages allow a wider variety of control flow constructs— while- and repeat-loops, if-then-else constructs, conditional gotos, and so on. Iteration spaces can both underestimate and overestimate the effect of such control flow on communication. First, consider a do-loop nested within a repeat-loop. In this case, the iteration space indicated by the do-loop may underestimate the actual number of activations of the edges in the loop body. Second, because of if-then-else constructs in a loop, an edge may be activated on only a subset of its iteration space. For this reason, we associate a control weight $c_{xy}(\xi)$ with every edge (x, y) and every iteration ξ in its iteration space.

One may think of $c_{xy}(\xi)$ as the expected number of activations of the edge (x, y) on an iteration with LIVs equal to ξ. Control weights enter multiplicatively into our estimate of communication cost.

Consider the if-then-else construct. In the ADG for such a construct there are branch nodes, since the values A and B can flow to one, but not both, of two alternative uses, depending on the outcome of the conditional. If the outcomes were known, we could simply partition the iteration space accordingly, and assign to each edge leaving these branch nodes the exact set of iterations on which data flows over the edge. Since this is impractical, we label these edges with the whole iteration space. The control weights of these edges capture the dynamic behavior of the program. Note that the edge labels are the activations of the edges for a particular run, and not the iteration spaces.

Iteration spaces and control weights are alternative models of multiple activations of an ADG edge. The iteration space approach, when it is usable, enables a more accurate model of communication cost. When an exact iteration space can be determined statically, as in the case of do-loops, it should be use to characterize control flow. Control weights should be used only when an exact iteration space cannot determined statically, e.g., for conditional gotos, multiway branches, while-loops, and breaks.

7.1.4 Nodes

There is not much to add to the foregoing material on this subject. However, it may be worthwhile to briefly consider the situation where a single definition actually reaches multiple uses. This is different from the branching situation, in which a definition has several alternative uses. Given alignments for the definition and for all the uses, the optimal way to make the object available at the positions where it is used is through a Steiner tree [13] in the metric space of possible alignments, spanning the alignment at the definition, the alignments at the uses, and additional positions as required to minimize the sum of the edge lengths. Determining the best Steiner tree is NP-hard for most metric spaces. We therefore approximate the Steiner tree as a star, adding one additional node, called a fanout node, at the center of the star. The possibility remains, however, of replacing this star by a true Steiner tree in a follow-on implementation.

Finally, for a program with do-loops, we need to characterize the introduction, removal, and update of LIVs, as we intend to allow data weights and alignments to be functions of these LIVs, Accordingly, for every edge that carries data into, out of, or around a loop, we insert a transformer node that enforces a relationship between the iteration spaces at its two ports..

ADG nodes define relations among the alignments of their ports, as well as among the data weights, control weights, and iteration spaces of their incident edges. The relations on alignments constrain the solution provided by alignment analysis. They must be satisfied if the computation performed at the nodes is to be done without further realignment. An alignment (of all ports, at all iterations of their iteration spaces) that satisfies the node constraints is said to be feasible.

The constraints force all realignment communication onto the edges of the ADG. By suitably choosing the node constraints, the apparently "intrinsic" communication of such operations as transpose and spread is exposed as realignment; this enables optimization of realignment.

Only intrinsic communication and computation happens within the nodes. In our current language model, the only program operations with intrinsic communication are reduction and vector-valued subscripting (scatter and gather), which access values from different parts of an object as part of the computation.

7.1.5 Nodal Relations and Constraints

We now list the constraints on alignment (the matrix L and the vector f introduced earlier) and the relations on iteration spaces and control weights that hold at each type of node. The relations on data weights are a simple consequence of language semantics and are not stated here.

Elementwise operations and fanout nodes: An elementwise arithmetic or logical operation on congruent objects $A_1$ through $A_k$ produces an object R of the same shape and size. Fanout nodes behave the same way. Alignments are identical at all ports:

$$L_{A_1} = \cdots = L_{A_k} = L_R$$

and $$f_{A_1} = \cdots = f_{A_k} = f_R.$$

Array sectioning: Let A be a d-dimensional object, and S a section specifier. Then A(S) is the object corresponding to the section of that object. A section specifier is a d-vector $(\sigma_1, \ldots, \sigma_d)$, where each $\sigma_i$ is either a scalar $l_i$ or a triplet $l_i{:}h_i{:}s_i$. Array axes corresponding to positions where the section specifier is a scalar are projected away, while the axes where the specifier is a triplet form the axes of A(S). Let the elements of S that are triplets be in positions $\lambda_1, \ldots, \lambda_c$ in ascending order. Let $e_i$ be a column vector of length d whose only nonzero entry is 1 at position i.

The axis alignment of A(S) is inherited from the dimensions of A that are preserved (not projected away) by the sectioning operation. Strides are multiplied by the sectioning strides. The offset alignment of A(S) is equal to the position of $A(l_1, \ldots, l_d)$:

$$L_{A(S)} = L_A[s_{\lambda_1} e_{\lambda_1}, \cdots, s_{\lambda_c} e_{\lambda_c}]$$

and $$f_{A(S)=gA}((l_1, \cdots, l_d)^T) = f_A + L_A(l_1, \cdots, l_d)^T$$

where denotes matrix multiplication.

Assignment to array sections: An assignment to a section of an array, as in the Fortran 90 statement A (1:100:2, 1:100:2) =B, is treated in SSA form as taking an input object A, a section specifier S, and a replacement object B conformable with A(S), and producing a result object R that agrees with B on A (S) and with A elsewhere. The result aligns with A, and the alignment of B must match that of A(S):

$$L_R = L_A, \; f_R = f_A$$

and $$L_B = L_{A(S)}, \; f_B = f_{A(S)}.$$

Transposition: Let A be a d-dimensional object, and let $\rho$ be a permutation of $(1, \ldots, d)$. The array object $\rho A$ (produced by an ADG transpose node) is the array $\rho A(\theta_{\rho 1}, \ldots, \theta_{\rho d}) = A(\theta_1, \ldots, \theta_d)$. (Idiomatic Fortran 90 uses the reshape and transpose intrinsics to perform general transposition.) The offset of the transposed array is unchanged, but its axes are a permutation of those of A :

$$L_{\rho A} L_A[e_{\rho 1}, \cdots, e_{\rho d}], \; f_{\rho A} = f_\alpha.$$

Reduction: Let A be a d-dimensional object, and let R be the (d−1)-dimensional object created by reducing along axis k of A. (The operation used for reduction is of no importance in determining alignments.) Let $n_k$ be the extent of A in axis k. R is aligned identically with A except that the template axis to which axis k of A was aligned is a space axis of R. The offset of R in this axis may be any of the positions occupied by A.

$$L_R = L_A[e_1, \cdots, e_{k-1}, e_{k+1}, \cdots, e_d]$$

and $$f_R = f_A + \beta L_A e_k, \text{ where } 0 \le \beta < n_k.$$

Spread: Let A be a d-dimensional object. Then the program operation spread(A, dim = k, ncopies = n) produces a (d+1)-dimensional object R with the new axis in position k, and with extent n along that axis. The alignment constraints are the converse of those for the dual operation, reduction. The new axis of R aligns with an unused template axis, the other axes of R inherit their alignments from A.

$$L_A = L_R[e_1, \cdots e_{k-1}, e_{k+1}, \cdots, e_{d+1}].$$

In order to make the communication required to replicate A residual rather than intrinsic, we require the offset alignment of A in dimension k to be replicated. This condition sounds strange, but it correctly assigns the required communication to the input edge of the spread node. In this view, a spread node performs neither computation nor communication, but transforms a replicated object into a higher-dimensional non-replicated object. Thus, $$f_A = f_R + f_r$$

where the vector $f_r$ has one nonzero component, a triplet in the axis spanned by the replicated dimension:

$$f_r = (0{:}n-1)L_R e_k.$$

The multiplication of a vector by a triplet is defined by $(0{:}h)(x_1, \ldots, x_t)^T \equiv ((0 {:}x_1 \; h{:}x_1), \ldots, (0{:}x_t \; h{:}x_t))$.

Merge nodes: Merge nodes occur when multiple definitions of a value converge. This occurs on entry to a loop and as a result of conditional transfers. Merge nodes enforce identical alignment at their ports.

The iteration space of the outedges is the union of the iteration spaces of inedges. The expected number of activations of the outedge with LIVs $\xi$ is just the sum of the expected number of activations with LIVs $\xi$ of the inedges. Therefore, the control weight of the outedge is the sum of the control weights of the inedges. Let the iteration spaces of the inedges be $I_1$ through $I_m$, and the corresponding control weights $c_1(\xi)$ through $c_R(\xi)$. Let the iteration space of the outedge be $I_R$ and its control weight be $c_R(\xi)$. Extend the $c_i$ for each input edge to $I_r$ by defining $c_i(\xi)$ to be 0 for all $\xi \in I_r - I_i$. Then $$I_R = \bigcup_{i=1}^{m} I_i$$

and $$\forall \xi \in I_R, c_R(\xi) = \sum_{i=1}^{m} c_i(\xi).$$

Branch nodes: Branch nodes occur when multiple mutually exclusive uses of a value diverge. Following the activation of the inedges, one of the outedges activates, with the selection made through program control flow. Branch nodes enforce identical alignment at their ports.

The relations satisfied by iteration spaces and control weights of the incident edges are dual to those of merge nodes. Let the iteration spaces of the outedges be $I_1$ through $I_m$, and the corresponding control weights be $c_1(\xi)$ through $c_m(\xi)$. Let the iteration space of the inedge be $I_A$ and its control weight be $c_A(\xi)$. Then $$I_A = \bigcup_{i=1}^{m} I_i$$

and $$\forall \xi \in I_A, c_A(\xi) = \sum_{i=1}^{m} c_i(\xi).$$

Transformer Nodes; Transformer nodes are of two types: those that relate iterations at the same nesting level, and those that relate iterations at different nesting levels.

Transformer nodes of the first kind (loop-back transformer nodes) have the form $$(1, \xi_1, \cdots, \xi_k | 1, \xi_1, \cdots, \xi_k + s),$$

corresponding to a change by the loop stride s in the value of the LIV $\xi_k$, and no change in any of the other LIVs in the loop nest. Let $\xi = (1, \xi_1, \cdots, \xi_k)$; define $\hat{\xi}(\xi) = (1, \xi_1, \ldots, \xi_k + s)$. Let the alignment on the input ("$\xi$") port be $L\theta + f$, and let the alignment on the output ("$\hat{\xi}$") port be $\hat{L}\theta + \hat{f}$, where L, f, $\hat{L}$, and $\hat{f}$ are all functions of $\xi$. Let I be the iteration space of the input port and $\hat{I}$ be the iteration space of the output port, Then the alignment constraints are $$\forall \xi \in I, L(\xi) = \hat{L}(\hat{\xi})$$

and $$\forall \xi \in I, f(\xi) = \hat{f}(\hat{\xi}).$$

The relation between the iteration spaces is $$\hat{I} = I = s(1, e_k^T)^T.$$

Consider one of the $(1, k|1, k+1)$ transformer nodes in FIG. 1. An offset alignment $f = 2k \neq$ and $f = 2k+1$ satisfies the node's alignment constraints. If the input iteration space is $I = \{(1,1)^T, \ldots, (1, n-1)^T\}$, then the output iteration space is $\hat{I} = \{(1,2)^T, \ldots, (1,n)^T\}$.

Transformer nodes of the second kind (entry/exit transformer nodes) have the form $$(1, \xi_1, \cdots, \xi_{k-1} | 1, \xi_1, \cdots, \xi_{k-1}, \xi_k = v)$$

or $$(1, \xi_1, \cdots, \xi_{k-1}, \xi_k = v | 1, \xi_1, \cdots, \xi_{k-1})$$

corresponding to the introduction or removal of the LIV $\xi_k$ in a loop nest. Let $\xi = (1, \xi_1, \ldots, \xi_{k-1})$ and define $\hat{\xi}(\xi) = (1, \xi_1, \ldots, \xi_{k-1}, v)$. Let the alignment on the input ("$\xi$") port be $L\theta + f$, and let the alignment on the output ("$\hat{\xi}$") port be $\hat{L}\theta = \hat{f}$. Let I be the iteration space of the input port and $\hat{I}$ be the iteration space of the output port. Then the alignment constraints are $$\forall \xi \in I, L(\xi) = \hat{L}(\hat{\xi})$$

and $$\forall \xi \in I, f(\xi) = \hat{f}(\hat{\xi}).$$

The relation satisfied by the iteration spaces is $$\hat{I} = I \times \{v\}$$

where X denotes the Cartesian product.

7.2 Modeling Residual Communication Cost Using the ADG

The ADG describes the structural properties of the program that we need for alignment and distribution analysis. Residual communication occurs on the edges of the ADG, but so far we have not indicated how to estimate this cost. This missing piece is the distance function d, where the distance d(p, q) between two alignments p and q is a nonnegative number giving the cost per element to change the alignment of an array from p to q. The set of all alignments is normally a metric space under the distance function d. We discuss the structure of d in Subsection 7.3.

We model the communication cost of the program as follows. Let E be the edge set of the ADG G, and let $I_{xy}$ be the iteration space of edge (x, y). For a vector $\xi$ in $I_{xy}$, let $w_{xy}(\xi)$ be the data weight, and let $c_{xy}(\xi)$ be the control weight of the edge. Finally, let $\pi$ be a feasible alignment for the program. Then the realignment cost of edge (x, y) at iteration $\xi$ is $c_{xy}(\xi) \cdot w_{xy}(\xi) \cdot d(\pi_x(\xi), \pi_y(\xi))$, and the total realignment cost of the ADG is $$K(G, d, \pi) = \sum_{(x,y) \in E} \sum_{\xi \in I_{xy}} c_{xy}(\xi) \cdot \omega_{xy}(\xi) \cdot d(\pi_x(\xi), \pi_y(\xi)). \quad (7)$$

As previously pointed out, Our goal is to choose $\pi$ to minimize this cost, subject to the node constraints. An analogous framework can be used to model redistribution cost.

7.3 Approximations

In presenting the ADG in Subsection 7.1, we did not consider how to determine certain parameters of the model and how other parameters would affect the complexity of the optimization algorithms. In this section, we discuss approximations to the model to address questions of practicality. The approximations are of two kinds: those that make model parameters attainable, and those that make the optimization problem tractable.

7.3.1 Control Weights

Our model of control weights as a function of LIVs is formally correct but difficult to evaluate in practice. We therefore approximate the control weight $c_{xy}(\xi)$ as an averaged control weight $c'_{xy}$ that does not depend on $\xi$. We now relate this averaged control weight to the execution counts of the basic blocks of the program.

Assume that we have a control flow graph (CFG) of the program (whose nodes are basic blocks of the program, and edges are transfers of control) and an estimate of the branching probabilities of the program. (These probabilities can be estimated using heuristics, profile information, or user input.) Let $p_{ij}$ be this estimate for edge (i, j) of the CFG; $p_{ij}$=0 if (i, j) is not an edge of the CFG. Let there be B basic block nodes in the CFG, plus the two distinguished nodes ENTER and EXIT. We first determine the execution counts of the basic blocks by setting up and solving "conservation of control flow" equations at each basic block. The conservation equation for basic block i with execution count $u_i$ is $u_i = \Sigma_{j \neq i} p_{ji} u_j$. In matrix notation, we solve the linear system $Au = v$, where $u=[u_1, \ldots, u_B]^T$ is the vector of execution counts, $v=[p_{ENTER,1}, \ldots, p_{ENTER,B}]^T$, and A is a B×B matrix with $A(i,i)=1$ and $A(i,j)=-p_{ji}$ for $i \neq j$. The (averaged) control weight $c'_{xy}$ of the ADG edge (x, y) coming from a computation in basic block b is then $u_b/|I_{xy}|$.

7.3.2 Mobile Alignment

So far in this subsection we have not constrained the form that mobile alignments may take. In principle, they could be arbitrary functions of the LIVs. To keep the analysis tractable, we restrict mobile alignments to be affine functions of the LIVs. Thus, the alignment function for an object within a k-deep loop nest with LIVs $\xi_1, \ldots, \xi_k$ is of the form $\alpha_0 + \alpha_1 \xi_1 + \ldots + \alpha_k \xi_k$, where the coefficient vector $\alpha = (\alpha_0, \ldots, \alpha_k)$ is what we must determine. We write this alignment succinctly in vector notation as $\alpha \xi^T$. Both $\alpha$ and $\xi$ are (k+1)-vectors. This reduces to the constant term $\alpha_0$ for an object outside any loops.

Likewise, we restrict the extents of objects to be affine in the LIVs, so that the size of an object is polynomial in the LIVs.

7.3.3 Replicated alignments

In Subsection 7.1, we re-introduced triplet offset positions to represent the possibility of replication (triplet offsets were also mentioned earlier). In practice, we treat the replication component of offset separately from the scalar component. The alignment space for replication has two elements, called R (for replicated) and N (for non-replicated). The extent of replication for an R alignment is the entire template extent in that dimension. In this approximate model of replication, communication is required only when changing from a non-replicated alignment to a replicated one. Thus, the distance function is given by $d(N, R)=1$ and $d(R, R)=d(R, N)=d(N, N)=0$. We call the process of determining these restricted replicated alignments replication labeling.

7.3.4 Distance Functions

In discussing the distance function in Subsection 7.2, we defined it to be the cost per element of changing from one alignment to another. Now consider the various kinds of such changes, and their communication costs on a distributed-memory machine. A change in axis or stride alignment requires unstructured communication. Such communication is hard to model accurately as it depends critically on the topological properties of the network (bisection bandwidth), the interactions among the messages (congestion), and the software overheads. Offset realignment can be performed using shift communication, which is usually substantially cheaper than unstructured communication. Replicating an object involves broadcasting or multicasting, which typically uses some kind of spanning tree. Such broadcast communication is likely to cost more than shift communication but less than unstructured communication.

We could conceivably construct a single distance capturing all these various effects and their interactions, but this would almost certainly make the analysis intractable. We therefore split the determination of alignments into several phases based on the relative costs of the different kinds of communication, and introduce simpler distance functions for each of these phases.

We determine axis and stride alignments (or the L-matrix of Subsection 7.1) in one phase, using the discrete metric to model axis and stride realignment. This metric, in which $d(p, q)=0$ if $p=q$ and $d(p, q)=1$ otherwise, is a crude but reasonable approximation for unstructured communication.

We determine scalar offset alignment in a separate phase, using the grid metric to model shift realignment. In this metric, alignments are the f-vectors of Subsection 7.1, and $d(f, f')$ is the Manhattan distance between them, i.e., $d(f, f')=\Sigma^t_{i=1}|f_i - f'_i|$. Note that the distance between f and f' is the sum of the distances between their individual components. This property of the metric, called separability, allows us to solve the offset alignment problem independently for each axis.

Finally, we use yet another phase to determine replicated offsets, using the alignments and distance function described in Subsection 7.3.3.

The ordering of these phases is as follows: we first perform axis and stride alignment, then replication labeling, and finally offset alignment.

The various kinds of communication interact with one another. For instance, shifting an object in addition to changing its axis or stride alignment does not increase the communication cost, since the shift can be incorporated into the unstructured communication needed for the change of axis or stride. We model such effects in a simple manner, by introducing a presence weight of an edge for each phase of the alignment process. The presence weight multiplies the contribution of the edge to the total realignment cost for that phase. Initially, all presence weights are 1. Edges that end up carrying residual axis or stride realignment have their presence weights set to zero for the replication and offset alignment phases. Similarly, edges carrying replication communication have their presence weights set to zero for the offset alignment phase.

7.4. Determining alignments using the ADG

In this section, we briefly describe our algorithms for determining alignment. Full descriptions of these algorithms are in papers we have previously published.

7.4.1 Axis and Stride Alignment

To determine axis and stride alignment, we minimize the communication cost $K(G, d, \pi)$ using the discrete metric as the distance function. The position of a port in this context is the L matrix of the alignment function. The algorithm we use, called compact dynamic programming, works in two phases.

In the first phase, we traverse the ADG from sources to sinks, building for each port a cost table indexed by position. The cost corresponding to position p gives the minimum cost of evaluating the subcomputation up to that port and placing the result in position p. The cost table at a node can be computed from the cost tables of its inputs and the distance functions. This recurrence is used to build the cost tables efficiently. As the position space is infinite, the cost table is represented as a collection of level sets of constant cost. At the end of the first phase, we examine the cost tables of the sinks of the ADG and place the sinks at their minimum-cost positions. In the second phase, we traverse the ADG from sinks to sources, placing the ports so as to achieve the minimum costs calculated in the first phase.

Compact dynamic programming is based on the dynamic programming described in Mace, "Memory Storage Patterns in Parallel Processing" Kluwer International Series in Engineering and Computer Science, Kluwer Academic Press, Norwell, Mass., 1987. The "compact" in the name refers to the way we exploit properties of the distance function to simplify the computation of costs and to compactly represent the cost tables. The method is exact if the ADG is a tree, but in general it is an approximation.

7.4.2 Offset Alignment

For offset alignment, a position is the vector f of the alignment function, and the Manhattan metric is the distance function. As the distance function is separable, we can solve independently for each component of the vector. For code where the positions do not depend on any LIVs, the constrained minimization can be solved exactly using linear programming. With mobile alignments, the residual communication cost can be approximated and this approximate cost minimized exactly using linear programming.

7.4.3 Replication labeling

For replication labeling, the position space has two positions for each template axis, called R (for replicated) and N (for non-replicated). The distance function is as given in Section 7.3.4. Note that this distance function is not a metric. The sources of replication are spread operations, certain vector-valued subscripts, and read-only objects with mobile offset alignment. As in the offset alignment case, each axis can be treated independently.

A minimum-cost replication labeling can be computed efficiently using network flow.

Conclusion

In view of the foregoing, it will now be evident that the present invention provides an efficient and effective alignment technique that can be employed to advantage in compilers that are used to compile programs written in data parallel languages.

What is claimed:

1. An optimizing compilation process for compiling a program written in a data-parallel language for execution on a computer having a distributed memory, parallel processor architecture, said compilation process comprising the steps of producing an array-distributed graph representation of said program;

aligning in said representation of said program each multi-dimensional array-valued object of said program, so that each axis of each such object aligns with a corresponding axis of a N-dimensional template and has a stride which is an integer multiple of the stride of said template along said corresponding axis, where N is the dimensionality of the program object having the greatest dimensionality;

replicating at least some of said array-valued objects across one or more axes of said template to minimize the total amount of broadcast communication;

determining the offset alignment for an origin on each axis of each array-valued object of said program relative to the origin of the corresponding axis of said template, to minimize the total amount of offset communication between said objects on each of said axes;

dynamically readjusting the offset alignment of objects that participate in iterative control flow to minimize the total amount of offset communication between said objects on each of said axes when summed over every iteration of said control flow.

* * * * *